(12) United States Patent
Ribarov et al.

(10) Patent No.: US 10,273,884 B2
(45) Date of Patent: Apr. 30, 2019

(54) ALTITUDE COMPENSATING BLEED VALVE

(71) Applicant: Hamilton Sundstrand Corporation, Windsor Locks, CT (US)

(72) Inventors: Lubomir A. Ribarov, West Hartford, CT (US); Thomas O. Harris, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 358 days.

(21) Appl. No.: 15/178,075

(22) Filed: Jun. 9, 2016

(65) Prior Publication Data
US 2017/0356348 A1   Dec. 14, 2017

(51) Int. Cl.
| | |
|---|---|
| *F02C 9/18* | (2006.01) |
| *F01D 17/14* | (2006.01) |
| *F01D 25/24* | (2006.01) |
| *F02C 3/04* | (2006.01) |
| *F02K 3/06* | (2006.01) |
| *F04D 29/32* | (2006.01) |

(Continued)

(52) U.S. Cl.
CPC .............. *F02C 9/18* (2013.01); *F01D 17/145* (2013.01); *F01D 25/24* (2013.01); *F02C 3/04* (2013.01); *F02K 3/06* (2013.01); *F04D 27/023* (2013.01); *F04D 27/0215* (2013.01); *F04D 27/0223* (2013.01); *F04D 29/325* (2013.01); *F04D 29/522* (2013.01); *F16K 1/126* (2013.01); *F16K 31/1221* (2013.01); *F05D 2220/323* (2013.01); *F05D 2240/35* (2013.01); *F05D 2260/52* (2013.01); *F05D 2260/606* (2013.01); *F05D 2260/85* (2013.01); *F05D 2270/312* (2013.01); *F05D 2270/65* (2013.01)

(58) Field of Classification Search
CPC ........ F04D 27/02; F01D 17/10; F01D 17/145; F01D 25/24; F01D 25/243; F02C 3/04; F02C 3/06; F02C 6/08; F16K 1/126; F16K 31/1221
See application file for complete search history.

(56) References Cited

U.S. PATENT DOCUMENTS

| | | | | |
|---|---|---|---|---|
| 2,978,166 | A | * | 4/1961 | Hahn .................. F02C 9/18 137/51 |
| 3,035,408 | A | | 5/1962 | Silver |

(Continued)

FOREIGN PATENT DOCUMENTS

| | | |
|---|---|---|
| GB | 1345351 | 1/1974 |
| WO | WO2015/130384 A2 | 9/2015 |

OTHER PUBLICATIONS

Extended European Search Report, for European Patent Application No. 17173662.2, dated Nov. 15, 2017, 14 pages.

(Continued)

*Primary Examiner* — Craig Kim
(74) *Attorney, Agent, or Firm* — Kinney & Lange, P.A.

(57) ABSTRACT

A valve includes a housing with a mounting portion, a venting portion, and a cap portion. The valve also includes a piston in the housing with a shaft, a disc, and a flange, the piston being moveable between a closed position and an open position. The valve also includes a vessel that is in contact with the cap portion and the flange wherein fluid pressure contained in the vessel biases the piston into one of the opened position and the closed position.

17 Claims, 6 Drawing Sheets

(51) Int. Cl.
*F04D 29/52* (2006.01)
*F16K 1/12* (2006.01)
*F16K 31/122* (2006.01)
*F04D 27/02* (2006.01)

(56) References Cited

U.S. PATENT DOCUMENTS

| | | | |
|---|---|---|---|
| 3,219,309 A | 11/1965 | Alberani | |
| 3,366,315 A * | 1/1968 | Alberani | F04D 27/0207 251/28 |
| 3,741,610 A | 6/1973 | Holland | |
| 4,106,510 A | 8/1978 | Hakim et al. | |
| 4,251,985 A * | 2/1981 | Sullivan | F02C 9/18 415/27 |
| 4,253,603 A | 3/1981 | Johnson | |
| 4,318,070 A | 3/1982 | Dohrmann et al. | |
| 4,391,290 A | 7/1983 | Williams | |
| 4,574,585 A * | 3/1986 | Conn | F01D 17/08 415/27 |
| 4,688,745 A | 8/1987 | Rosenthal | |
| 4,991,389 A | 2/1991 | Schafer | |
| 5,257,498 A | 11/1993 | Nikkanen et al. | |
| 6,122,905 A | 9/2000 | Liu | |
| 6,481,210 B1 | 11/2002 | Chapman | |
| 7,131,612 B2 | 11/2006 | Baptist et al. | |
| 7,540,144 B2 | 6/2009 | Makuszewski | |
| 7,555,905 B2 * | 7/2009 | Borcea | F02C 6/08 215/279 |
| 7,780,117 B2 | 8/2010 | Botura et al. | |
| 7,909,261 B2 | 3/2011 | Ellstrom et al. | |
| 7,921,652 B2 | 4/2011 | Kirby | |
| 7,959,109 B2 | 6/2011 | Dasilva et al. | |
| 7,976,272 B2 | 7/2011 | Suciu et al. | |
| 8,128,347 B2 | 3/2012 | Sokhey | |
| 8,572,985 B2 | 11/2013 | Waddleton | |
| 8,794,588 B1 | 8/2014 | Jorgensen | |
| 8,814,498 B2 | 8/2014 | Goodman et al. | |
| 8,858,164 B2 | 10/2014 | Colotte et al. | |
| 9,080,687 B2 | 7/2015 | Franconi et al. | |
| 9,169,779 B2 | 10/2015 | Winter | |
| 9,212,757 B2 | 12/2015 | Rossi et al. | |
| 2007/0089429 A1 * | 4/2007 | Makuszewski | F02C 9/18 60/785 |
| 2010/0083667 A1 | 4/2010 | Franconi | |
| 2010/0154987 A1 | 6/2010 | Vontell, Sr. | |
| 2011/0056210 A1 | 3/2011 | Griffin et al. | |
| 2012/0128470 A1 * | 5/2012 | Goodman | F01D 17/105 415/145 |
| 2013/0312843 A1 * | 11/2013 | Franconi | F16K 31/1221 137/81.1 |

OTHER PUBLICATIONS

Pressure-Compensated Flow Control Valves, website <http://www.valvehydraulic.info/creation-and-control-of-fluid-flow/pressure-compensated-flow-control-valves.html>, 3 pages, visited Feb. 4, 201.

Parker, TPC Pressure, Temperature Compensated Flow Control Valve, website <(b) http://www.parker.com/portal/site/PARKER/menuitem.de7b26ee6a659c147cf26710237ad1ca/?vgnextoid=fcc9b5bbec622110VgnVCM10000032a71dacRCRD&vgnextchannel=fcc9b5bbec622110VgnVCM10000032a71dacRCRD&vgnextfmt=default&vgnextdiv=687505&vgnextcatid=1537967&vgnextcat=TPC+PRESSURE%2C+TEMPERATURE+COMPENSATED+FLOW+CONTROL+VALVE&Wtky=>, 4 pages, visited Feb. 4, 2016.

\* cited by examiner

ALTITUDE COMPENSATING BLEED VALVE

BACKGROUND

The present invention relates generally to fluid valves, and more particularly to a bleed valve for a gas turbine engine.

There are a variety of know gas turbine engine configurations, including two-spool, high-bypass engines. Such an engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. A fan is also connected to the low pressure spool, forward of the low pressure compressor. The combustion system is disposed between the high pressure compressor and the high pressure turbine and receives compressed air from the compressors and fuel provided by a fuel injection system. A combustion process is carried out within the combustion system to produce high energy exhaust gases to produce thrust and turn the high and low pressure turbines, which drive their respective compressors and the fan to sustain the combustion process.

The high and low pressure spools are efficient when interacting with gases, in part, due to the seals between the static and the rotating components of the spools. Therefore, a substantial amount of energy is required to rotate the spools, and that energy is normally provided by the high energy gases from the combustion system. However, prior to starting the engine, these gasses are not available for use, so a starter motor must be used to turn one or both of the spools. In order to decrease the load on the starter, one or both of the compressors can be bled or essentially bypassed by employing a start bleed valve. During start, a compressor bleed valve is open and allows gas from the compressor to exit the engine without being further compressed or traveling through the combustion system or the turbines. Once the engine is started and reaches idle speed, the compressor bleed valve is typically closed, although it can be actuated in specific operational conditions to maintain compressor stability and prevent compressor stall or surge. A bleed valve that can be actuated to both aid in engine starting and provide engine compressor stability is known as a start and stability bleed valve. Unfortunately, the icy ambient conditions that a gas turbine engine can encounter during normal operation can freeze a traditional start or stability bleed actuation system, preventing it, for example, to open. If the valve fails to actuate open, it can prevent starting the engine and/or prevent proper compressor stability control.

SUMMARY

In one embodiment, a valve includes a housing with a mounting portion, a venting portion, and a cap portion. The valve also includes a piston in the housing with a shaft, a disc, and a flange, the piston being moveable between a closed position and an open position. The valve also includes a vessel that is in contact with the cap portion and the flange wherein fluid pressure contained in the vessel biases the piston into one of the opened position and the closed position.

A method of bleeding air from a gas turbine engine of an aircraft includes providing a bleed valve for the gas turbine engine that includes a piston that controls flow through the bleed valve and a vessel that is sealed and is configured to exert a force on the piston to bias the piston into a closed position. The method also includes rotating a plurality of rotating components in the engine with the bleed valve opened to start the engine, pressurizing an engine core and a fan case, and closing the bleed valve in response to the engine core and fan case being pressurized. The method further includes increasing the force from the vessel on the piston by ascending the aircraft, decreasing the force from the vessel on the piston by descending the aircraft, and landing the aircraft. The method further yet includes turning off the gas turbine engine to depressurize the engine core and fan case, and opening the bleed valve in response to the engine core and fan case being depressurized.

The present summary is provided only by way of example, and not limitation. Other aspects of the present disclosure will be appreciated in view of the entirety of the present disclosure, including the entire text, claims and accompanying figures.

Figure 1:
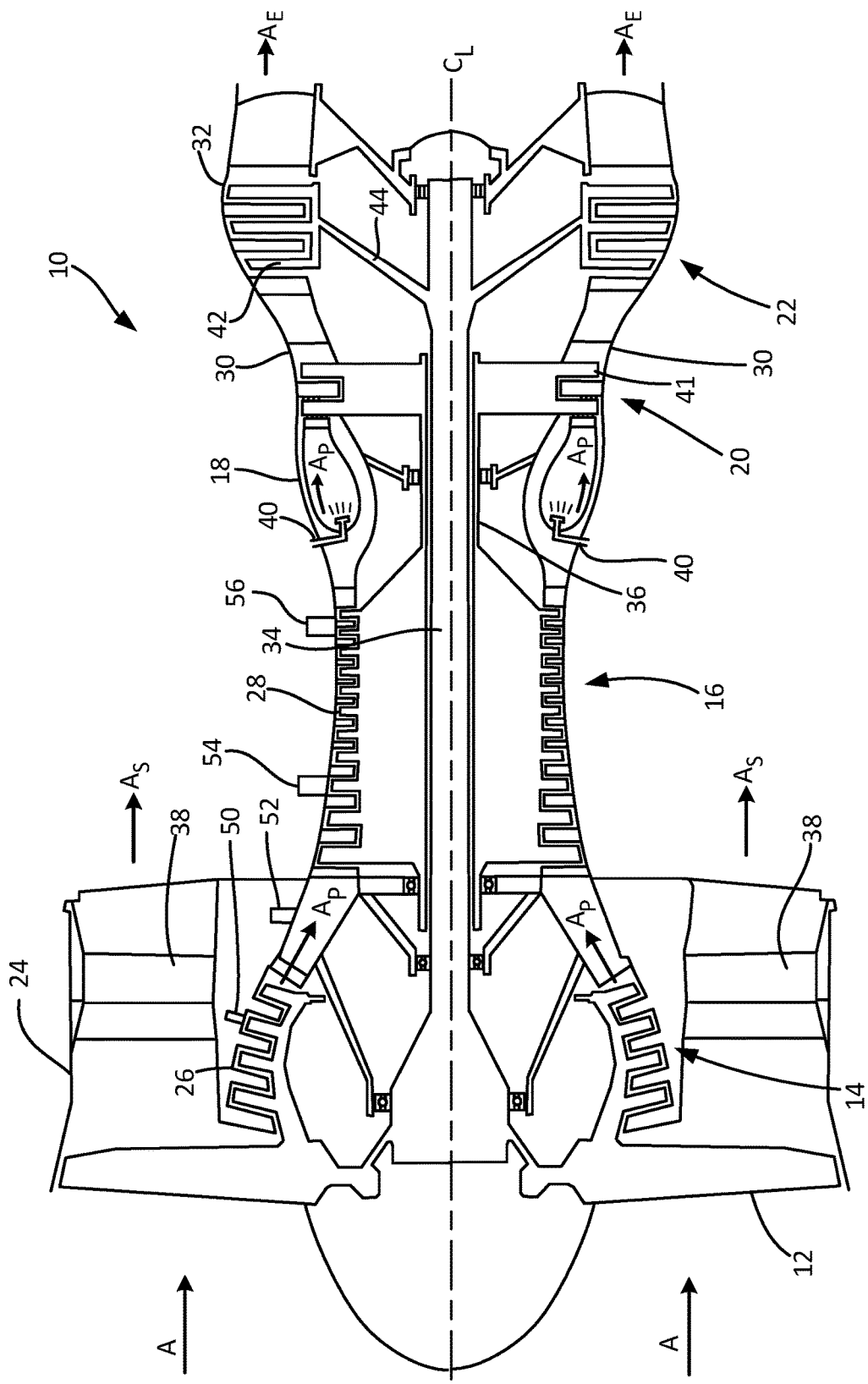
FIG. 1 is a schematic cross-sectional view of a gas turbine engine.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

FIG. 1 is a schematic side cross-sectional view of gas turbine engine 10 for an aircraft (not shown). Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, fan case 24, LPC case 26, HPC case 28, HPT case 30, LPT case 32, low pressure shaft 34, high pressure shaft 36, fan exit guide vanes 38, fuel injectors 40, HPT blades 41, LPT blades 42, support rotor 44, bleed valve 50, bleed valve 52, bleed valve 54, bleed valve 56, inlet air A, primary air $A_P$, secondary air $A_S$ (also known as bypass air), and longitudinal engine centerline axis $C_L$.

In the illustrated embodiment, gas turbine engine 10 comprises a dual-spool turbofan engine, although other engine configurations are possible in alternative embodiments. Gas turbine engine 10, of which the operational principles are well known in the art, comprises fan 12, LPC 14, HPC 16, combustor section 18, HPT 20, and LPT 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, HPT case 30 and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air $A_P$ and secondary air $A_S$ after passing through fan 12. Fan 12 is rotated by LPT 22 through low pressure shaft 34 (either directly as shown or through a gearbox, not shown) to accelerate secondary air $A_S$ (also known as bypass air) through fan exit guide vanes 38, thereby producing a major portion of the thrust output of engine 10. Primary air $A_P$ (also known as gas path air) is directed first into LPC 14 and then into HPC 16. LPC 14 and HPC 16 work together to incrementally increase the pressure of primary air $A_P$. HPC 16 is rotated by HPT 20 through high pressure shaft 36 to provide primary air $A_P$ to combustor section 18. The compressed air is delivered to combustor section 18, along with fuel through fuel injectors 40, such that this fuel-air mixture is ignited by ignitors (not shown) thus resulting in a combustion process which can be carried out to produce the high energy gases necessary to turn HPT 20 and LPT 22. These high energy gases continue through gas turbine engine 10 whereby they are typically passed through an exhaust nozzle (not shown) to further produce thrust.

After being compressed in LPC 14 and HPC 16 and participating in a combustion process in combustor section 18 to increase pressure and energy, primary air $A_P$ is mixed with fuel in the combustor section 18. This fuel-air mixture is ignited by ignitors (not shown) and burned in the combustor section 18 producing exhaust air $A_E$. Exhaust air $A_E$ flows through HPT 20 and LPT 22 such that HPT blades 41 and LPT blades 42 extract energy from the flow of exhaust air $A_E$. Exhaust air $A_E$ impinges on HPT blades 41 to cause rotation of high pressure shaft 36, which turns HPC 16. Exhaust air $A_E$ also impinges on LPT blades 42 to cause rotation of support rotor 44 and low pressure shaft 34, which turns fan 12 and LPC 14.

In addition, primary air $A_P$ can be bled off from at least one of LPC 14, HPC 16, and in between LPC 14 and/or HPC 16 through bleed valves 50, 52, 54, and/or 56, respectively. Bleed valves 50, 52, 54, and 56 are each located proximate to one of LPC 14 and HPC 16 and are each connected to the corresponding LPC case 26 and HPC case 28. When opened, bleed valves 50, 52, 54, and/or 56 allow primary air $A_P$ to exit LPC 14 or HPC 16 to join secondary air $A_S$ (or alternatively, be vented to atmosphere). Thereby, the pressure inside of LPC 14 and/or HPC 16 can be reduced to allow for starting of gas turbine engine 10 or prevention of compressor operational instabilities such as stall or surge.

Depicted in FIG. 1 is one embodiment of the present invention, to which there are alternative embodiments. For example, engine 10 can be a three spool engine. In such an embodiment, engine 10 has an intermediate pressure compressor (IPC) between LPC 14 and HPC 16 and an intermediate pressure turbine (IPT) between HPT 20 and LPT 22, wherein the intermediate compressor is connected to the intermediate turbine with an additional intermediate shaft such that low pressure shaft, intermediate shaft and high pressure shaft are each concentrically and coaxially disposed around longitudinal engine centerline axis $C_L$.

Figure 2A:
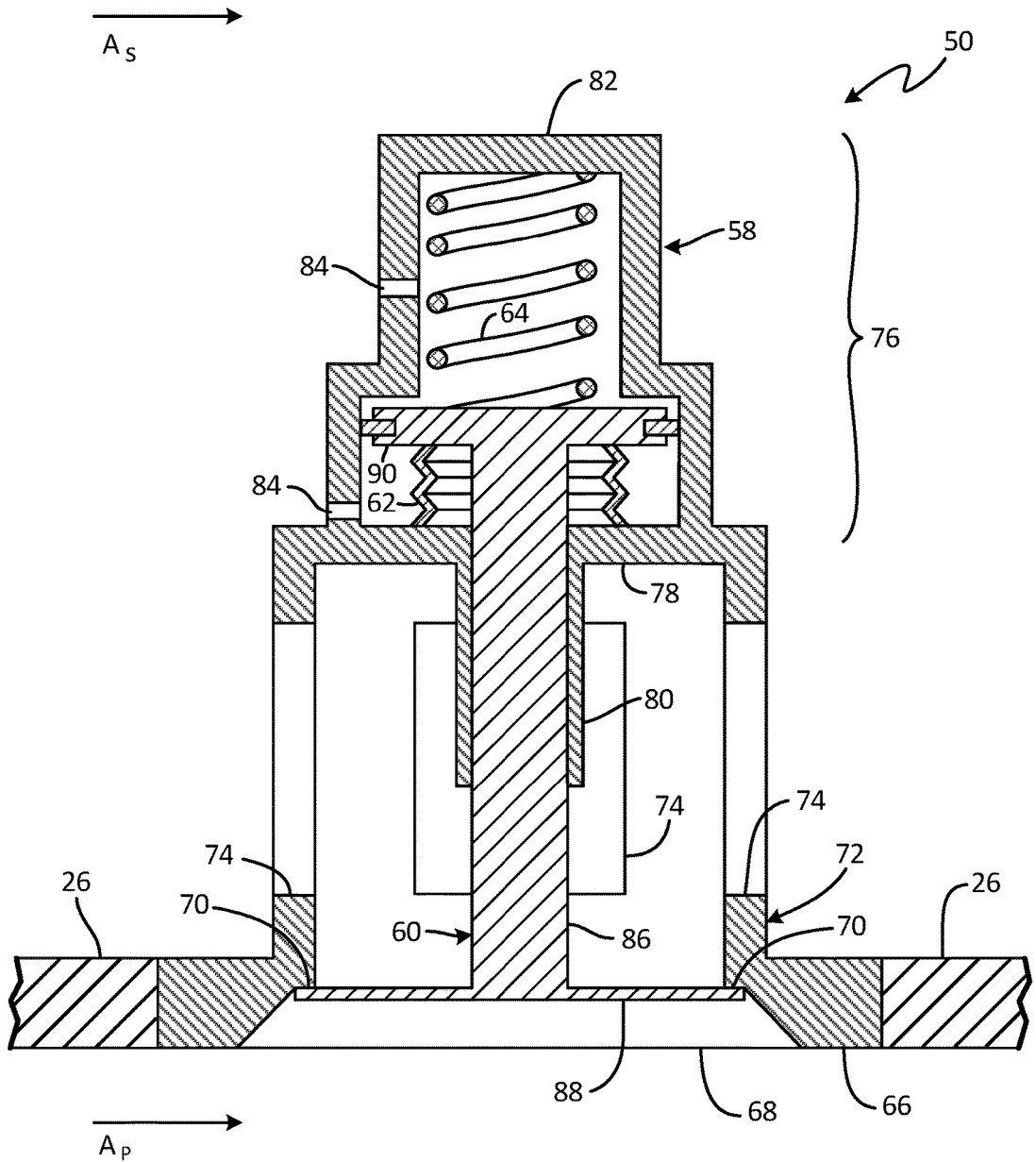
FIG. 2A is a cross-sectional view of an embodiment of a valve in a closed position.
Figure 2B:
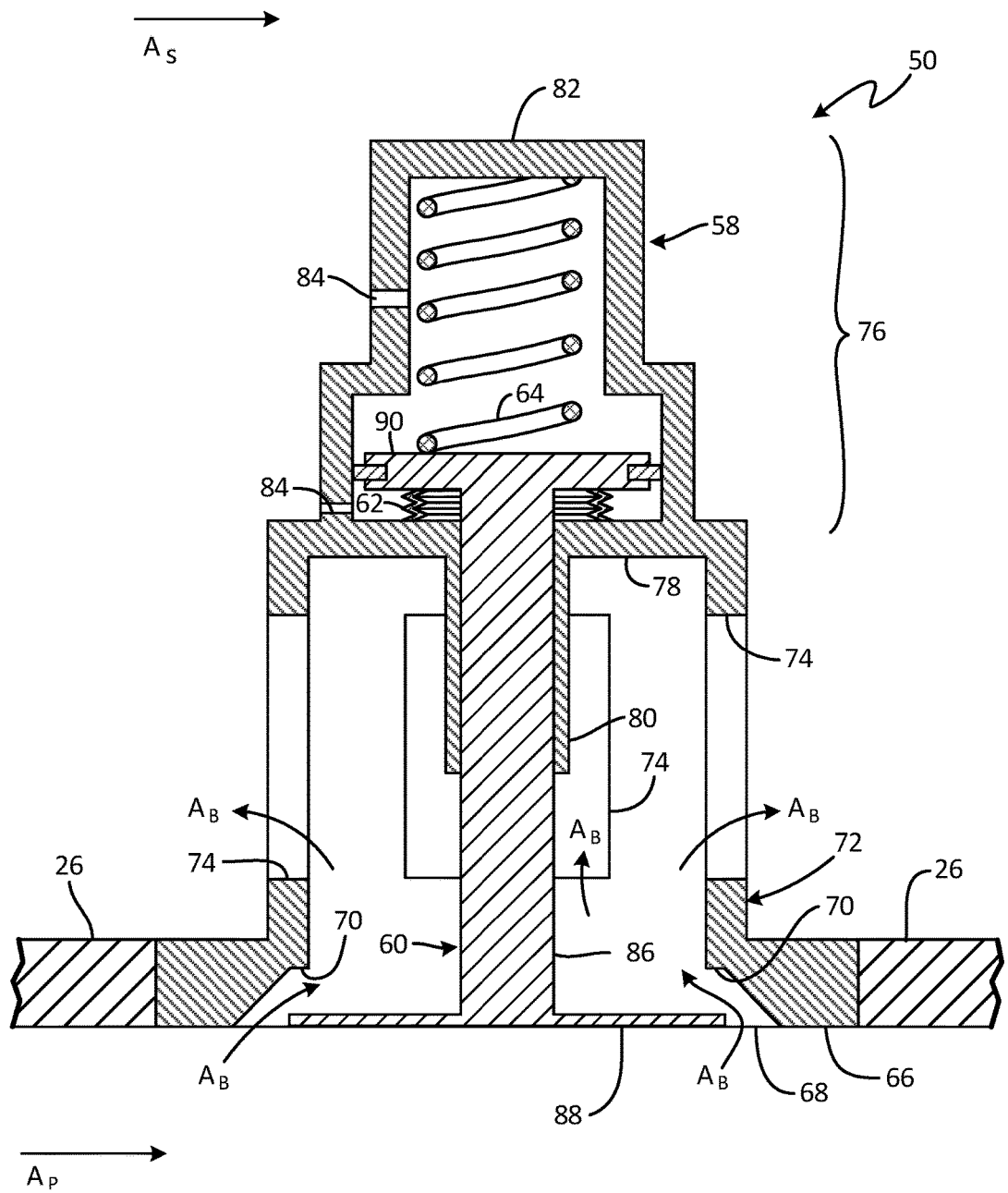
FIG. 2B is a cross-sectional view of the valve of FIG. 2A in an opened position.

FIG. 2A is a cross-sectional view of bleed valve 50 in a closed position. FIG. 2B is a cross-sectional view of bleed valve 50 in an opened position. Although only bleed valve 50 is shown in FIGS. 2A and 2B, any of bleed valves 50, 52, 54, or 56 (shown in FIG. 1) can be similar or identical to the illustrated configuration of bleed valve 50.

In the illustrated embodiment, bleed valve 50 includes housing 58 with piston 60, bellows 62, and spring 64 movably positioned inside of housing 58. At one end of housing 58 is mounting portion 66 which is attached to LPC case 26. Mounting portion 66 includes inlet 68 and seat 70. Adjacent to mounting portion 66 is venting portion 72 which includes multiple outlet ports 74 (e.g., four ports 74, although only three are visible in FIGS. 2A and 2B). Adjacent to venting portion 72 is cap portion 76 which includes base 78, collar 80, lid 82, and vents 84. Base 78 is located at one end of cap portion 76 and supports collar 80. Lid 82 is at the opposite end of cap portion 76, and vents 84 extend through a side wall of housing 58.

Piston 60 extends into or through mounting portion 66, venting portion 72, and cap portion 76 and can slide within collar 80 between a closed position (shown in FIG. 2A) and an opened position (shown in FIG. 2B wherein piston 60 is closer to engine centerline axis $C_L$, shown in FIG. 1). Piston 60 includes shaft 86 with disc 88 at one end and flange 90 at the opposite end. When piston 60 is in the closed position, disc 88 is in contact with seat 70, which limits or prevents flow through bleed valve 50. When piston is in the opened position, disc 88 is spaced apart from seat 70, which allows a portion of primary air $A_P$, called bleed air $A_B$, to escape from LPC 14 (shown in FIG. 1) through inlet 68, between seat 70 and disc 88, and out of outlet ports 74 (as shown in FIG. 2B). After exiting outlet ports 74, bleed air $A_B$ can join secondary air $A_S$ and exits gas turbine engine 10 (shown in FIG. 1).

The position of piston 60 is controlled by bellows 62 and spring 64. In the illustrated embodiment, bellows 62 is a flexible, fluid-tight, sealed pressure vessel made of stainless steel that is formed into an accordion shape which allows bellows 62 to expand and contract. Bellows 62 is in contact with base 78 and flange 90. A biasing force provided by bellows 62 is responsive to engine operating conditions, including altitude. Bellows 62 can be pressurized, for example, with air at a local ground ambient air pressure which an aircraft (not shown) to which gas turbine engine 10 (shown in FIG. 1) is mounted is flying from or to. Alternatively, bellows 62 can be pressurized to a designated setpoint, such as the typical ground ambient pressure of 101 kPa (14.7 psi). This pressurization can occur when bellows 62 is extended (as shown in FIG. 2A), contracted (as shown in FIG. 2B), or at some position in between (not shown). Bellows 62 is compressed when piston 60 is in the opened position, although in alternative embodiments, bellows 62 can be compressed when piston 60 is in the closed position. Spring 64 is a biasing member that is configured to bias piston 60 into the opened position. Spring 64 is compressed when piston 60 is in the closed position, although in alternative embodiments, spring 64 can be compressed when piston 60 is in the opened position. Spring 64 is positioned between lid 82 and flange 90, on the opposite side of flange 90 from bellows 62. As illustrated in FIGS. 2A and 2B, bellows 62 is arranged to selectively bias piston 60 in a direction opposite that of spring 64, as detailed further below.

When the aircraft is on the ground, bellows 62 exerts no significant force on flange 90 to bias piston 60 into either the closed or the opened position. This is because, at ground level, the pressure difference between bellows 62 and the interior of cap portion 76 is insignificant due to bellows 62 being pressurized to approximately the value of atmospheric pressure and atmospheric air being allowed into cap portion 76 by vents 84. When gas turbine engine 10 (shown in FIG. 1) is turned off, there is no pressure difference between the inside and the outside of LPC case 26. In the illustrated embodiment, the thin, flexible material from which bellows 62 is constructed has a negligible spring constant so bellows 62 provides a negligible amount of spring force to piston 60. Thus piston 60 moves into the opened position because the only significant force on it is from spring 64. Piston 60 will remain in the opened position during at least the beginning of the engine startup process because the pressure difference between primary air $A_P$ and secondary air $A_S$ is still relatively low.

Towards the ending of the engine startup process, the pressure differential across LPC case 26 becomes significant. Once the engine is running in steady state operation, this pressure difference can be, for example, 183 kPa (26.5 psi) or higher. In this situation, there will be a force on disc 88 that biases piston 60 into the closed position. More specifically, bleed valve 50 is configured such that the net force on piston 60 (including the forces from bellows 62 and spring 64) moves piston 60 moves into the closed position. Thus, bleed valve 50 closes.

During high altitude cruising, the pressure difference between primary air $A_P$ and secondary air $A_S$ is reduced down to, for example, 115 kPa (16.7 psi). This is due in part because the atmospheric pressure at high altitude is lower than at ground level, for example, 10.3 kPa (1.5 psi). This phenomenon means that there is a pressure difference between bellows 62 and the interior of cap portion 76 that can be, for example, 104.7 kPa (15.2 psi). Thereby, bellows 62 exerts a force on flange 90 to bias piston 60 into the closed position. More specifically, the forces from bellows 62 and the force from primary air $A_P$ on disc 88 still overcomes the force from spring 64. Thus bleed valve 50 remains closed until gas turbine engine 10 (shown in FIG. 1) is turned off.

The components and configuration of bleed valve 50 as shown in FIGS. 2A and 2B allow for spring 64 to be stronger (i.e., have a higher spring constant) than if bellows 64 were not present. This is because bellows 64 increases its force on piston 60 as the aircraft ascends, compensating for the decreasing force on piston 60 from primary air $A_P$. Thereby, once the aircraft lands and gas turbine engine 10 is turned off, bleed valve 50 will open more reliably and is less likely to be defeated by any icy conditions that bleed valve 50 can have encountered or can be encountering.

Figure 3:
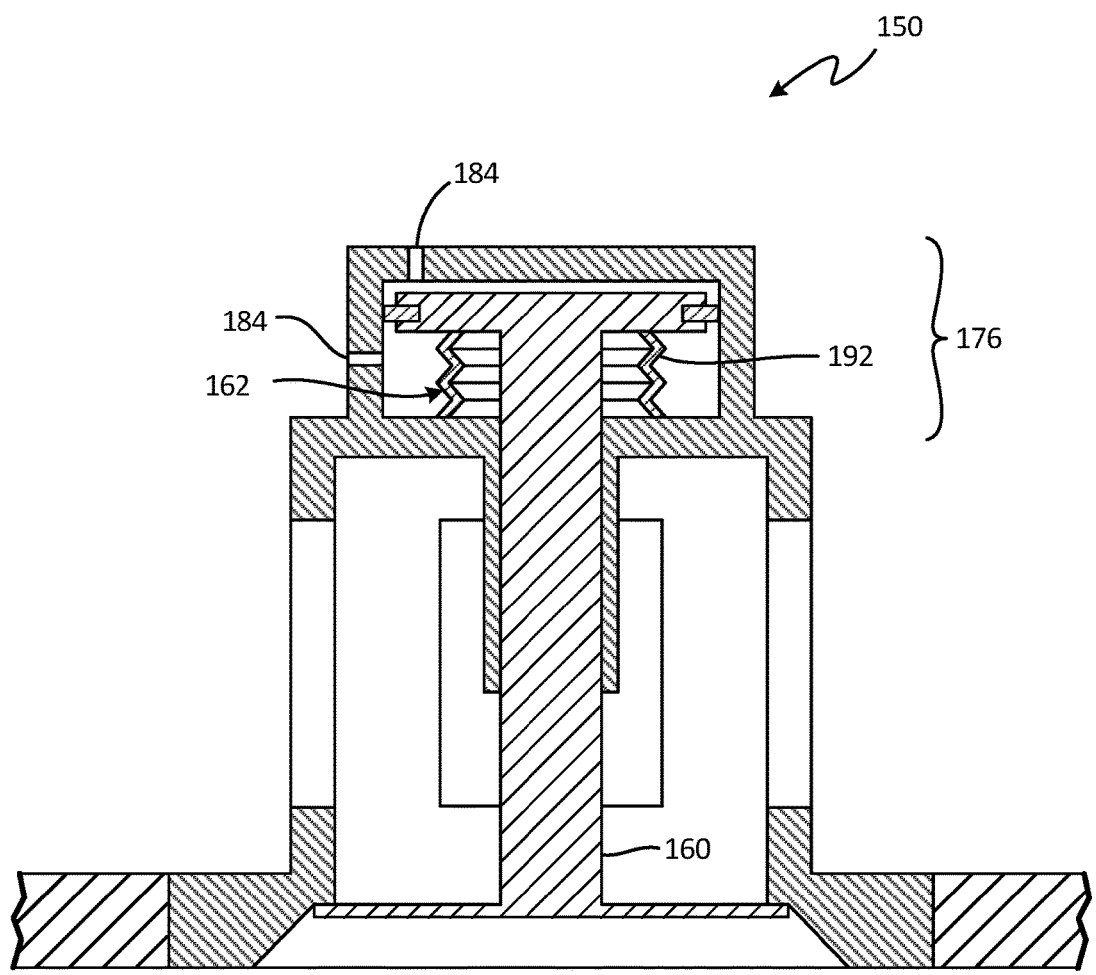
FIG. 3 is a cross-sectional view of an alternate embodiment valve in a closed position.

FIG. 3 is a cross-sectional view of alternate embodiment bleed valve 150 in a closed position. Although only bleed valve 150 is shown in FIG. 3, any of bleed valves 50, 52, 54, or 56 (shown in FIG. 1) can be similar or identical to the illustrated configuration of bleed valve 150.

Most of the components and configuration of bleed valve 150 are substantially the same as those of bleed valve 50 (shown in FIGS. 2A and 2B). The main differences reside in cap portion 176 which has repositioned vents 184 and no longer includes spring 64 (shown in FIGS. 2A and 2B). Instead, bellows 162 has been configured to have a substantial spring constant, allowing bellows 162 to function as both a pressure vessel and as a biasing member. This can be accomplished, for example, by configuring the bends of wall 192 of bellows 162 to bias piston 160 into the opened position with substantially the same spring constant and preload as spring 64 (shown in FIGS. 2A and 2B). Bellows 162 can be pressurized, for example, to the same specification as bellows 62 (shown in FIGS. 2A and 2b) in order to allow bleed valve 150 to function the same as bleed valve 50. Thereby, bleed valve 150 is opened when gas turbine engine 10 (shown in FIG. 1) is shut off and when it is being started up, but then bleed valve is closed at the end of startup and remains closed during taxi, takeoff, cruising, and landing.

Figure 4:
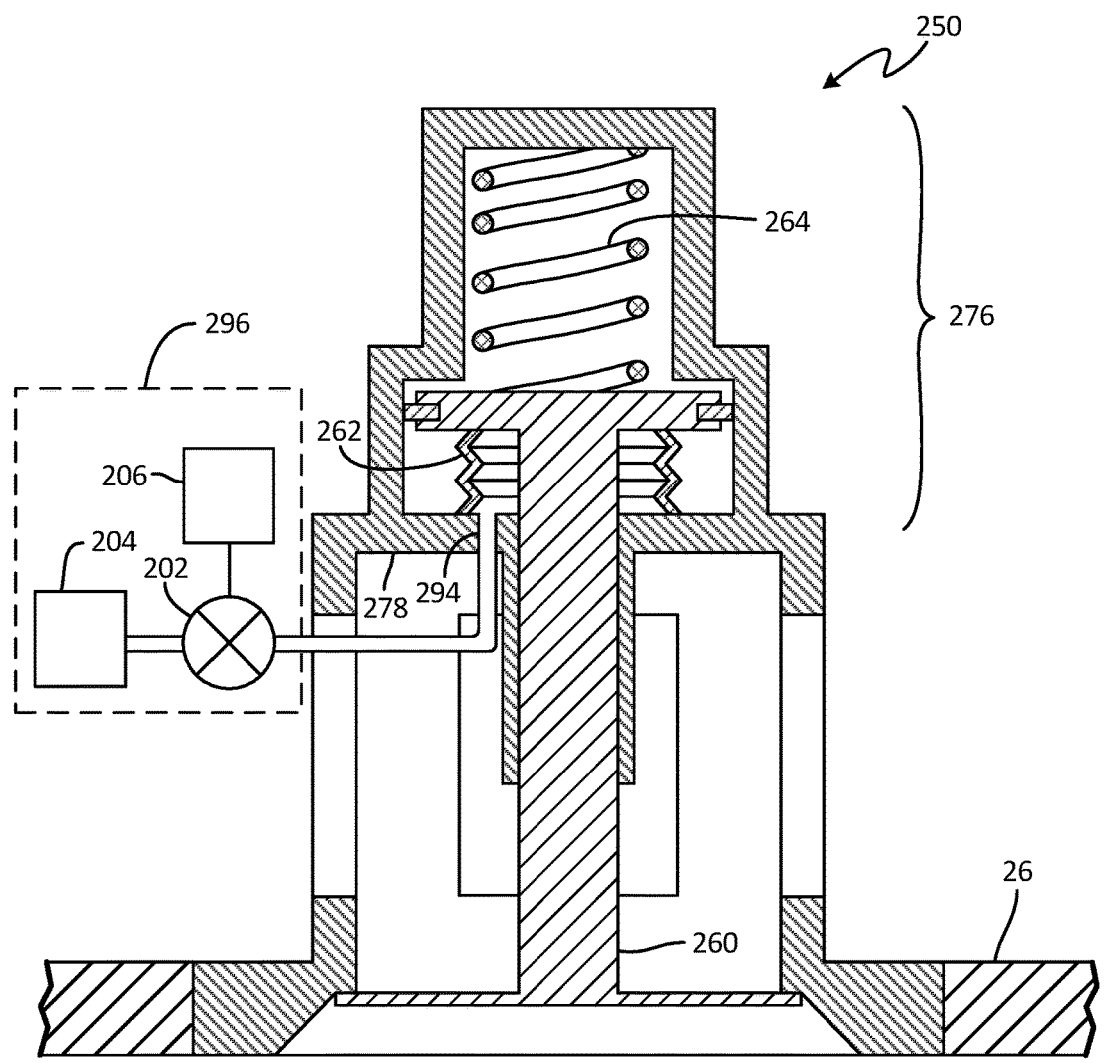
FIG. 4 is cross-sectional view of another alternate embodiment valve in a closed position.

FIG. 4 is cross-sectional view of another alternate embodiment bleed valve 250 in a closed position. Although only bleed valve 250 is shown in FIG. 4, any of bleed valves 50, 52, 54, or 56 (shown in FIG. 1) can be similar or identical to the illustrated configuration of bleed valve 250.

Most of the components and configuration of bleed valve 250 are substantially the same as those of bleed valve 50 (shown in FIGS. 2A and 2B). The main differences reside in cap portion 276 which has orifice 294 through base 278 that fluidly connects the interior of bellows 262 with bellows pressure system 296. Bellows pressure system 296 allows for active control of bleed valve 250.

In the illustrated embodiment, pressure system 296 includes fluid valve 202 which is fluidly connected to fluid source 204. Fluid valve 202 is also operatively connected to controller 206 to control the configuration of fluid valve 202 to be opened or closed. In the former configuration, bellows 262 can be pressurized by fluid flowing from fluid source 204, through fluid valve 202 along orifice 294 and base 278, and into bellows 262. The converse can also happen when fluid valve 202 is opened in that bellows 262 can be depressurized by fluid being drawn into fluid source 204 from bellows 262.

To operate bleed valve 250, bellows 262 can be pressurized by pressure system 296, for example, to the same specification as bellows 62 (shown in FIGS. 2A and 2b), and then sealed by closing fluid valve 202. This condition allows bleed valve 250 to function the same as bleed valve 50. Thereby, bleed valve 250 is opened when gas turbine engine 10 (shown in FIG. 1) is shut off and when it is being started up, but then bleed valve is closed at the end of startup and remains closed during taxi, takeoff, cruising, and landing. Alternatively, pressure system 296 can open bleed valve 250 by depressurizing bellows 262, which causes bellows 262 to pull on piston 260 and also allows spring 264 to force piston 260 into the opened position. This can occur at any time during the operation of gas turbine engine 10, for example, to maintain stability of LPC 14 (shown in FIG. 1) and prevent compressor surge or stall. Conversely, pressure system 296 can close bleed valve 250 by pressurizing bellows 262, which causes bellows 262 to push on piston 260, defeating the force of spring 264 to bias piston 260 into the closed position. This can occur at any time during the operation of gas turbine engine 10, for example, to ensure that bleed valve 250 remains shut. The combination of opening and closing of bleed valve 250 by pressure system 296 can also be used to unstick bleed valve 250 if it has encountered icy conditions.

Because bleed valve 250 can be used to bleed air during startup and at any time during engine operation, bleed valve 250 is both a bleed valve and a stability valve. Therefore, gas turbine engine 10 (shown in FIG. 1) can have one bleed valve 250 in addition to, for example, one bleed valve 50 (shown in FIGS. 2A and 2B). Bleed valves 50 and 250 can be proximate to each other or they can be in separate compressor sections from each other. Alternatively, gas turbine engine 10 can have only one bleed valve 250 since bleed valve 250 provides both bleeding and stabilizing capabilities.

Figure 5:
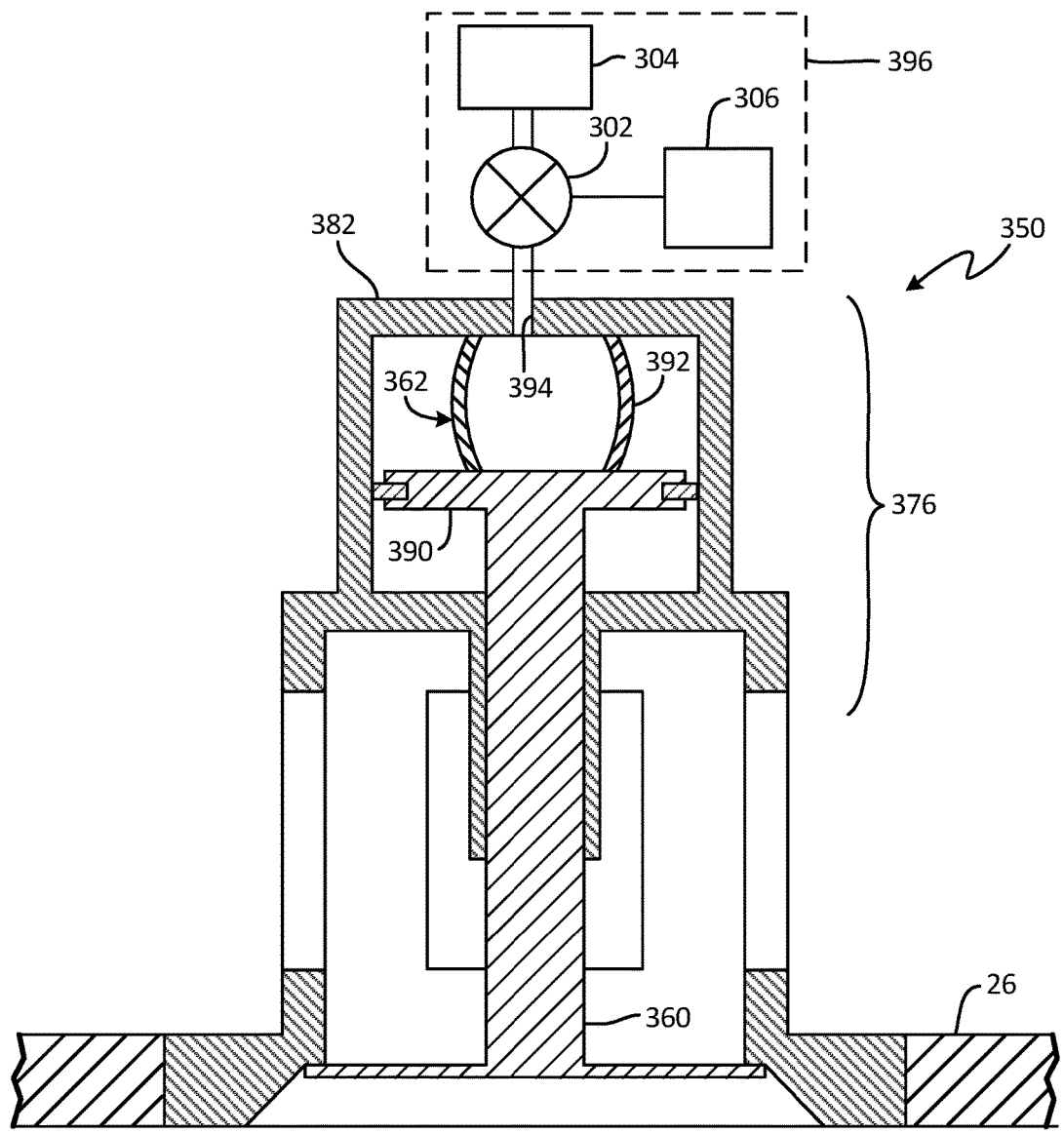
FIG. 5 is cross-sectional view of yet another alternate embodiment valve in a closed position.

FIG. 5 is cross-sectional view of yet another alternate embodiment bleed valve 350 in a closed position. Although only bleed valve 350 is shown in FIG. 5, any of bleed valves 50, 52, 54, or 56 (shown in FIG. 1) can be similar or identical to the illustrated configuration of bleed valve 350.

Most of the components and configuration of bleed valve 350 are substantially the same as those of bleed valve 50 (shown in FIGS. 2A and 2B) with some similar modifications thereto that are present in bleed valve 150 (shown in FIG. 3) and bleed valve 250 (shown in FIG. 4). The main differences reside in cap portion 376 which has airbag 362 instead of a bellows, wherein airbag 362 is positioned between lid 382 and flange 390. In addition, orifice 394 extends through lid 382 to fluidly connect the interior of airbag 362 with airbag pressure system 396. Airbag pressure system 396 allows for active control of bleed valve 350

In the illustrated embodiment, airbag 362 is a flexible, fluid-tight pressure vessel made of an elastomeric material (or another suitable material) which allows airbag 362 to be elastically deformable to expand and contract. Airbag 362 has been configured to have a substantial spring constant, allowing airbag 362 to function as both a pressure vessel and as a biasing member. This can be accomplished, for example, by configuring the thickness and length of wall 392 of airbag 362 to bias piston 360 into the opened position with substantially force as spring 64 (shown in FIGS. 2A and 2B). To operate bleed valve 350, airbag 362 can be pressurized by pressure system 396, for example, to the same specification as bellows 62 (shown in FIGS. 2A and 2b), and then sealed by closing fluid valve 302. Fluid valve 302 receives fluid from fluid source 304. Fluid valve 302 is also operatively connected to controller 306 to control the configuration of fluid valve 302 to be opened or closed. This condition allows bleed valve 350 to function the same as bleed valve 50 (shown in FIGS. 2A and 2B). Thereby, bleed valve 350 is opened when gas turbine engine 10 (shown in FIG. 1) is shut off and when it is being started up, but then bleed valve is closed at the end of startup and remains closed during taxi, takeoff, cruising, and landing. Alternatively, pressure system 396 can open bleed valve 350 by pressurizing airbag 362, which causes airbag 362 to push on piston 360. This can occur at any time during the operation of gas turbine engine 10, for example, to maintain stability of LPC 14 (shown in FIG. 1) and prevent compressor surge or stall. Conversely, pressure system 396 can close bleed valve 350 by depressurizing airbag 362, which causes airbag 362 to pull on piston 360 to bias piston 360 into the closed position. This can occur at any time during the operation of gas turbine engine 10, for example, to ensure that bleed valve 350 remains shut. The combination of opening and closing of bleed valve 350 by pressure system 396 can also be used to unstick bleed valve 350 if it has encountered icy conditions.

Because bleed valve 350 can be used to bleed air during startup and at any time during engine operation, bleed valve 350 is both a bleed valve and a stability valve. Therefore, gas turbine engine 10 (shown in FIG. 1) can have one bleed valve 350 in addition to, for example, one bleed valve 50 (shown in FIGS. 2A and 2B). Bleed valves 50 and 350 can be proximate to each other or they can be in separate compressor sections from each other. Alternatively, gas turbine engine 10 can have only one bleed valve 350 since bleed valve 350 provides both bleeding and stabilizing capabilities.

Discussion of Possible Embodiments

The following are non-exclusive descriptions of possible embodiments of the present invention.

A valve according to an exemplary embodiment of this disclosure, among other possible things includes: a housing comprising: a mounting portion at a first end, the mounting portion including an inlet and a seat; a venting portion adjacent to the mounting portion, the venting portion including a plurality of outlet ports; and a cap portion adjacent to the venting portion; a piston movably positioned in the housing, the piston comprising: a shaft; a disc connected to the shaft; and a flange connected to the shaft at a location spaced apart from the disc; wherein the piston is moveable between a closed position wherein the disc is in contact with the seat and an opened position wherein the disc is spaced apart from the seat; and a vessel that is in contact with the cap portion and the flange, wherein fluid pressure contained in the vessel biases the piston into one of the opened position and the closed position.

The valve of the preceding paragraph can optionally include, additionally and/or alternatively, any one or more of the following features, configurations and/or additional components:

A further embodiment of the foregoing valve, wherein the vessel can be a bellows.

A further embodiment of any of the foregoing valves, wherein: the cap portion can include a shoulder proximate to the venting portion and a lid distal to the venting portion; the vessel can be positioned between the shoulder and the flange; and a biasing member can be positioned between the lid and the flange and is in contact with the cap portion and the flange.

A further embodiment of any of the foregoing valves, wherein the valve can further comprise: a biasing member in contact with the cap portion and the flange, the biasing member configured to bias the piston into the opened position; wherein the vessel is configured to bias the piston into the closed position.

A further embodiment of any of the foregoing valves, wherein the valve can further comprise: a fluid valve that is fluidly connected to the vessel and to a fluid source, the fluid valve being configured to allow control fluid pressure contained in the vessel; and a controller operatively connected to the fluid valve configured to control the configuration of the fluid valve.

A further embodiment of any of the foregoing valves, wherein the vessel can be sealed and can be pressurized to atmospheric pressure at ground level.

A further embodiment of any of the foregoing valves, wherein: the cap portion can include a base proximal to the venting portion and a lid distal to the venting portion; the vessel can be positioned between the lid and the flange and includes a vessel wall; and a vessel inlet can extend through one of the base and the lid to fluidly connect the vessel to a fluid source.

A further embodiment of any of the foregoing valves, wherein positive fluid pressure can bias the piston into the closed position and the vessel wall can bias the piston into the opened position.

A further embodiment of any of the foregoing valves, wherein the valve can further comprise: a fluid valve that is fluidly connected to the vessel and to a fluid source, the fluid valve being configured to allow control fluid pressure contained in the vessel; and a controller operatively connected to the fluid valve configured to control the configuration of the fluid valve.

A gas turbine engine extending along an axis according to an exemplary embodiment of this disclosure, among other possible things includes: an engine core comprising: a compressor; a combustor downstream of the compressor; a turbine downstream of the combustor; and a core case surrounding at least one of the compressor, the combustor, and the turbine; a fan case surrounding the engine core; a fan positioned in the fan case and connected to the engine core; and a first bleed valve connected to the core case, the first bleed valve comprising: a first housing with a first seat; a first valve element positioned in the housing, the first valve element being moveable between a first closed position wherein the first valve element is in contact with the first seat and a first opened position wherein the first valve element is spaced apart from the first seat; a first inlet through the first housing; a first outlet through the first housing that is fluidly connected to the first inlet when the first valve element is in the first opened position; and a first vessel that is in contact with the first housing and the first valve element, wherein fluid pressure contained in the first vessel biases the first valve element into one of the first opened position and the first closed position.

The gas turbine engine of the preceding paragraph can optionally include, additionally and/or alternatively, any one or more of the following features, configurations and/or additional components:

A further embodiment of the foregoing gas turbine engine, wherein the first bleed valve can be positioned adjacent to the compressor.

A further embodiment of any of the foregoing gas turbine engines, wherein the gas turbine engine can further comprise: a second bleed valve comprising: a second housing with a second seat; a second valve element positioned in the second housing, the second valve element being moveable between a second closed position wherein the second valve element is in contact with the second seat and a second opened position wherein the second valve element is spaced apart from the second seat; a second inlet through the second housing; a second outlet through the second housing that is fluidly connected to the second inlet when the second valve element is in the second opened position; a second vessel that is in contact with the second housing and the second valve element, wherein fluid pressure contained in the second vessel biases the second valve element into one of the second opened position and the second closed position; a fluid valve that is fluidly connected to the second vessel and to a fluid source, the fluid valve being configured to allow control fluid pressure contained in the second vessel; and a controller operatively connected to the fluid valve configured to control the configuration of the fluid valve.

A further embodiment of any of the foregoing gas turbine engines, wherein the second bleed valve can be positioned adjacent to the compressor.

A further embodiment of any of the foregoing gas turbine engines, wherein the first outlet and the second outlet can be positioned between the core case and the fan case.

A further embodiment of any of the foregoing gas turbine engines, wherein the valve element can be closer to the axis in the opened position than in the closed position.

A further embodiment of any of the foregoing gas turbine engines, wherein the first bleed valve can further comprise: a biasing member in contact with the housing and the valve element, the biasing member configured to bias the valve element toward the opened position; wherein the vessel is configured to bias the valve element toward the closed position.

A further embodiment of any of the foregoing gas turbine engines, wherein the vessel can be a flexible, fluid-tight, sealed pressure vessel.

A further embodiment of any of the foregoing gas turbine engines, wherein the first bleed valve can further comprise: a fluid valve that is fluidly connected to the first vessel and to a fluid source, the fluid valve being configured to allow control fluid pressure contained in the first vessel; and a controller operatively connected to the fluid valve configured to control the configuration of the fluid valve.

A method of bleeding air from a gas turbine engine of an aircraft according to an exemplary embodiment of this disclosure, among other possible things includes: providing a bleed valve for the gas turbine engine, the bleed valve comprising: a piston that controls flow through the bleed valve; and a vessel that is sealed and is configured to exert a force on the piston to bias the piston into a closed position; rotating a plurality of rotating components in the engine with the bleed valve opened to start the engine; pressurizing an engine core and a fan case; closing the bleed valve in response to the engine core and fan case being pressurized; increasing the force from the vessel on the piston by ascending the aircraft; decreasing the force from the vessel on the piston by descending the aircraft; landing the aircraft; stopping fuel flow to a combustor to turn off the gas turbine engine; depressurizing the engine core and fan case; and opening the bleed valve in response to the engine core and fan case being depressurized.

The method of the preceding paragraph can optionally include, additionally and/or alternatively, any one or more of the following features, configurations and/or additional components:

A further embodiment of the foregoing method, wherein the method can further comprise unsealing the vessel and pressurizing the vessel again after landing the aircraft to open the bleed valve.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For instance, although described with respect to air pressurization of a bellows or airbag, other suitable fluids can be used with a valve of the present invention in further embodiments.

The invention claimed is:

1. A valve comprising:
   a housing comprising:
      a mounting portion at a first end, the mounting portion including an inlet and a seat;
      a venting portion adjacent to the mounting portion, the venting portion including a plurality of outlet ports; and
      a cap portion adjacent to the venting portion;
   a piston movably positioned in the housing, the piston comprising:
      a shaft;
      a disc connected to the shaft; and
      a flange connected to the shaft at a location spaced apart from the disc;
      wherein the piston is moveable between a closed position wherein the disc is in contact with the seat and an opened position wherein the disc is spaced apart from the seat;
   a vessel that is in contact with the cap portion and the flange, wherein fluid pressure contained in the vessel biases the piston into one of the opened position and the closed position;
   a fluid valve that is fluidly connected to the vessel and to a fluid source, the fluid valve being configured to allow control of fluid pressure contained in the vessel; and
   a controller operatively connected to the fluid valve configured to control the configuration of the fluid valve.

2. The valve of claim 1, wherein the vessel is a bellows.

3. The valve of claim 1, wherein:
   the cap portion includes a shoulder proximate to the venting portion and a lid distal to the venting portion;
   the vessel is positioned between the shoulder and the flange; and
   a biasing member is positioned between the lid and the flange and is in contact with the cap portion and the flange.

4. The valve of claim 1, further comprising:
   a biasing member in contact with the cap portion and the flange, the biasing member configured to bias the piston into the opened position;
   wherein the vessel is configured to bias the piston into the closed position.

5. The valve of claim 1, wherein the vessel is sealed and is pressurized to atmospheric pressure at ground level.

6. The valve of claim 1, wherein:
   the cap portion includes a base proximal to the venting portion and a lid distal to the venting portion;
   the vessel is positioned between the lid and the flange and includes a vessel wall; and
   a vessel inlet extends through one of the base and the lid to fluidly connect the vessel to a fluid source.

7. The valve of claim 6, wherein positive fluid pressure biases the piston into the closed position and the vessel wall biases the piston into the opened position.

8. A gas turbine engine extending along an axis, the gas turbine engine comprising:
   an engine core comprising:
      a compressor;
      a combustor downstream of the compressor;
      a turbine downstream of the combustor; and
      a core case surrounding at least one of the compressor, the combustor, and the turbine;
   a fan case surrounding the engine core;
   a fan positioned in the fan case and connected to the engine core; and
   a first bleed valve connected to the core case, the first bleed valve comprising:
      a first housing with a first seat;
      a first valve element positioned in the housing, the first valve element being moveable between a first closed position wherein the first valve element is in contact with the first seat and a first opened position wherein the first valve element is spaced apart from the first seat;
      a first inlet through the first housing;
      a first outlet through the first housing that is fluidly connected to the first inlet when the first valve element is in the first opened position;
      a first vessel that is in contact with the first housing and the first valve element, wherein fluid pressure contained in the first vessel biases the first valve element into one of the first opened position and the first closed position;
      a fluid valve that is fluidly connected to the first vessel and to a fluid source, the fluid valve being configured to allow control of fluid pressure contained in the first vessel; and
      a controller operatively connected to the fluid valve configured to control the configuration of the fluid valve.

9. The gas turbine engine of claim 8, wherein the first bleed valve is positioned adjacent to the compressor.

10. The gas turbine engine of claim 8, further comprising:
    a second bleed valve comprising:
       a second housing with a second seat;
       a second valve element positioned in the second housing, the second valve element being moveable between a second closed position wherein the second valve element is in contact with the second seat and a second opened position wherein the second valve element is spaced apart from the second seat;
       a second inlet through the second housing;
       a second outlet through the second housing that is fluidly connected to the second inlet when the second valve element is in the second opened position;
       a second vessel that is in contact with the second housing and the second valve element, wherein fluid pressure contained in the second vessel biases the second valve element into one of the second opened position and the second closed position;
       a fluid valve that is fluidly connected to the second vessel and to a fluid source, the fluid valve being configured to allow control fluid pressure contained in the second vessel; and
       a controller operatively connected to the fluid valve configured to control the configuration of the fluid valve.

11. The gas turbine engine of claim 10, wherein the second bleed valve is positioned adjacent to the compressor.

12. The gas turbine engine of claim 10, wherein the first outlet and the second outlet are positioned between the core case and the fan case.

13. The gas turbine engine of claim 8, wherein the valve element is closer to the axis in the opened position than in the closed position.

14. The gas turbine engine of claim 8, wherein the first bleed valve further comprises:

a biasing member in contact with the housing and the valve element, the biasing member configured to bias the valve element toward the opened position;

wherein the vessel is configured to bias the valve element toward the closed position.

15. The gas turbine engine of claim 8, wherein the vessel is a flexible, fluid-tight, sealed pressure vessel.

16. A method of bleeding air from a gas turbine engine of an aircraft, the method comprising:

providing a bleed valve for the gas turbine engine, the bleed valve comprising:
 a piston that controls flow through the bleed valve;
 a vessel that is sealed and is configured to exert a force on the piston to bias the piston into a closed position;
 a fluid valve fluidly connected to the vessel and a fluid source, the fluid valve being configured to allow control of fluid pressure contained in the vessel; and
 a controller operatively connected to the fluid valve configured to control the configuration of the fluid valve;

rotating a plurality of rotating components in the engine with the bleed valve opened to start the engine;

pressurizing an engine core and a fan case;

closing the bleed valve in response to the engine core and fan case being pressurized;

increasing the force from the vessel on the piston by ascending the aircraft;

decreasing the force from the vessel on the piston by descending the aircraft;

landing the aircraft;

turning off the gas turbine engine to depressurize the engine core and fan case; and opening the bleed valve in response to the engine core and fan case being depressurized.

17. The method of claim 16, further comprising:

unsealing the vessel and pressurizing the vessel again after landing the aircraft to open the bleed valve.

\* \* \* \* \*